United States Patent Office 2,799,255
Patented July 16, 1957

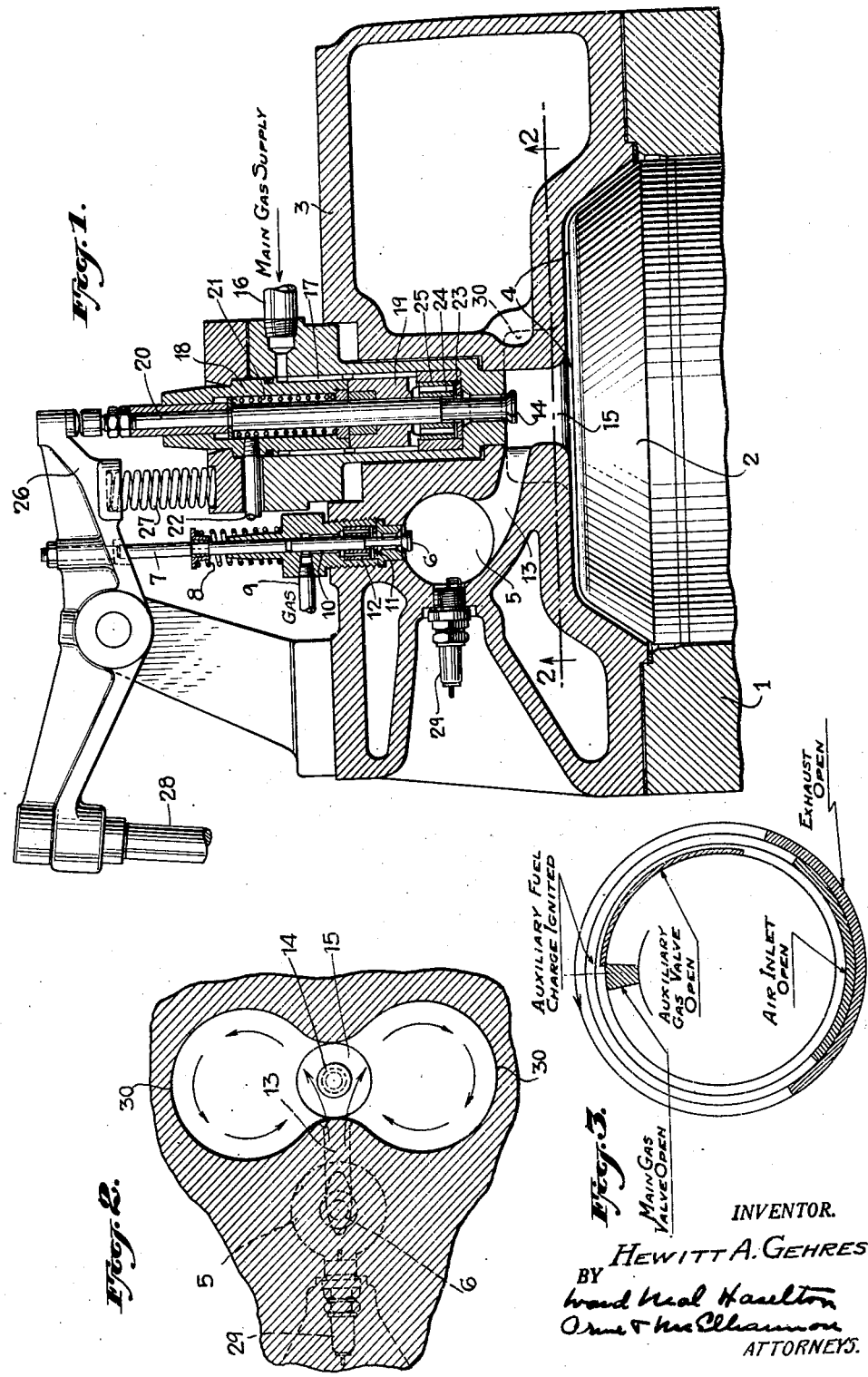

2,799,255
GAS ENGINE

Hewitt A. Gehres, Mount Vernon, Ohio, assignor to The Cooper-Bessemer Corporation, Mount Vernon, Ohio, a corporation of Ohio Application March 14, 1955, Serial No. 493,993

5 Claims. (Cl. 123—1)

The invention relates to gas engines fueled (for example) by natural gas or like gases such as methane, ethane, propane, butane, pentane or mixtures thereof. Two-cycle gas engines as heretofore constructed and operated with fuel of the above type have fired quite evenly if ignited at fairly low compression and at or near full load conditions, but have been prone to irregular and unsatisfactory operation at higher compression, or under low load conditions. The invention aims to provide such an engine in which gaseous fuels of the above type may be fired satisfactorily and with augmented efficiency, under both full load and low load conditions. The invention also enables more efficient operation at higher compressions, both in two-cycle and four-cycle gas engines, a particular advantage being the avoidance of prematuring under high compression.

In carrying out the invention, the steps of exhausting the burned gases from the cylinder and charging in air for combustion may be understood as performed in accordance with known gas engine practice, it being understood that air, in contrast with a mixture of air and gas, is initially admitted to the cylinder. Before the compression stroke is completed, fuel is admitted under pressure into an auxiliary combustion chamber which communicates through a connecting passageway with the cylinder space, and the fuel is thoroughly mixed with air entering the auxiliary combustion chamber to form in the latter a mixture of fuel and air which is sufficiently uniform and lean to avoid self-ignition or prematuring as compression proceeds. However, sufficient fuel is injected into the auxiliary combustion chamber to provide a mixture capable of accurately timed ignition during the latter part of the compression stroke from an extraneous source, as by spark plug or oil injection. The amount of fuel so injected and fired in the auxiliary combustion chamber will be relatively small and may remain constant at all loads, being preferably less than is required to operate the engine even when idling.

The main charge of gaseous fuel begins to be injected under pressure into the cylinder near the end of the compression stroke and continues until the amount of fuel required for the load has been injected. Shortly before the compression stroke is completed, the mixture in the auxiliary combustion chamber is ignited as above described, to produce a stream of gases hot enough to ignite the main fuel charge and traveling at extremely high velocity from the auxiliary combustion chamber through the above mentioned passageway toward the cylinder space. Into this stream the main gaseous charge is projected, thus creating a violent turbulence which disperses the main gaseous charge in the compressed air and burns the main charge of gas effectively as it mixes with the air. The charge is thereby burned progressively on a flame front, so to speak, as contrasted to an effort to ignite a predetermined mixture of gas and air established in the main combustion chamber prior to ignition.

The main gaseous charge of fuel is injected late enough in the compression stroke to prevent it from self-igniting early enough to cause prematuring or detonation, and the above mentioned auxiliary stream of hot gases provides the turbulence necessary to force the main gaseous charge into the air and burn the latter with the requisite rapidity and completeness. A condition of burning the injected main gaseous charge is thus established which is somewhat comparable to that obtaining in a diesel engine powered by injected oil, but with the distinction that the gaseous fuel, within the practical range of injection pressure, so resists penetration into the compressed air that it will not of itself intimately mix with the air quickly enough to burn efficiently, if injected late enough to avoid prematuring. The blast produced by the above described stream of hot gases issuing from the auxiliary combustion chamber thus provides the turbulence necessary to ignite the main charge of gas with sufficient rapidity and completeness, as it proceeds into the air. In this way highly efficient operation may be attained at compression pressures comparable to those obtaining in oil-diesel practice, and operation will be efficient at lower compression and at all loads. At lower loads, the fuel charge injected and ignited in the auxiliary combustion chamber as above described, need not be altered, and regulation may be obtained merely by altering the pressure at which the main gaseous fuel charge is injected, under the control of an ordinary governor. The compression remains substantially the same at low load except for the smaller main fuel charge injected, and the engine fires reliably at low load, the tendency of prior two cycle gas fueled engines to miss at low load being overcome. Higher compression may be used without prematuring, in both two-cycle and four-cycle engines.

Further features and advantages of the invention will be in part obvious and in part specifically referred to in the description hereinafter contained which, taken in conjunction with the accompanying drawings, discloses a preferred form of engine cylinder constructed and equipped to operate in accordance with the invention. The disclosure, however, should be regarded as merely illustrative of the principles of the invention in its broader aspects. In the drawings:

Fig. 1 is a central longitudinal sectional view taken through the head end of a two-cycle engine cylinder constructed and equipped to operate in accordance with the invention.

Fig. 2 is a detail section taken on the line 2—2 of Fig. 1, looking in the direction of the arrows.

Fig. 3 is a timing diagram illustrating the cycle of operation of a two-cycle, gas powered engine in accordance with the invention.

Fig. 1 shows an engine cylinder 1 in which the piston 2 reciprocates in the usual manner, and having the cylinder head member 3 at its upper end so as to provide combustion space 4 between the piston and the cylinder head. As shown, the piston 2 is at full compression.

An auxiliary fuel chamber is shown at 5 in Figs. 1 and 2, and this is the chamber in which a substantially uniform mixture of gas and air is formed as the compression stroke proceeds, i. e. prior to the time when the piston reaches the full compression position shown in Fig. 1. In the illustrated form of the invention, the auxiliary fuel chamber 5 is provided with a fuel admission valve 6 having a stem 7, and the valve being urged toward closed position by a spring 8. Gas under pressure is supplied from a line 9 through an annular passageway 10 which surrounds the valve stem 7, and preferably a check valve 11 is interposed between valve 6 and the line, to prevent the back flow of gas should the pressure in chamber 5 at any time exceed the pressure in line 9. As shown, the check valve 11 is constituted by a ring which when open, affords the flow of gas through the annular space between the ring and the valve stem 7, but when closed the ring 11 seats against the mouths of ducts 12 to prevent the backward flow of gas.

The auxiliary fuel chamber 5 is provided with a passageway 13 which is directed toward the path of flow of the main fuel charge into the combustion space 4, as hereinafter discussed in more detail. As the compression stroke proceeds, air under pressure is forced from the combustion space 4 through passageway 13 into chamber 5 to mix with fuel being admitted through valve 6. Preferably the chamber 5 is made spherical and the passageway 13 directed tangentially with respect to the chamber, to promote the intimate and uniform mixing of the air and gas in chamber 5, the objective being that the air and fuel mixture in chamber 5 shall be uniform enough and lean enough in gas to avoid spontaneous ignition as the compression proceeds, but enough gas being admitted to afford accurately timed ignition from an outside source, shortly before full compression is reached.

The main fuel charge may be admitted through a valve 14 in the cylinder head, which is in communication with the combustion space 4 through a passageway 15 into which the passageway 13 also opens. The fuel valve 14 is in communication with a high pressure gas supply line 16 through an annular passageway 17 which surrounds collars 18 and 19 through which the stem 20 of valve 14 extends. A spring 21 is shown to urge valve 14 toward closed position, and a vent 22 may be provided for the annular space in which the spring 21 is located.

Preferably a check valve 23 similar to the check valve 11 previously described is provided for the main gas supply, to come into operation if at any time the pressure in the cylinder should exceed the pressure under which the main gas charge is injected into the cylinder. As shown, the check valve 23 seats against the mouths of ducts 24 in fitting 25, when in closed position.

The fuel valves 6 and 14 should be understood as operated and timed by an appropriate actuating mechanism such as the rocker arm 26, which is shown as biased by a spring 27, and having a rod 28 which may be understood as actuated by appropriate cam mechanism (not shown).

In operation, as the compression stroke proceeds fuel will be fed into the auxiliary combustion chamber 5 through valve 6 and at the same time, compressed air from the cylinder space will be projected into chamber 5 through passageway 13 to form in chamber 5 an intimate and uniform mixture of air and gas, this mixture being lean enough to avoid spontaneous ignition as the compression proceeds. The above mixture is formed early enough in the compression stroke to enable the air and gas to be intimately mixed, thereby to avoid ignition until accurately timed ignition is secured near the end of the compression stroke from an outside source, such as the spark plug 29.

The injection of the main fuel charge through valve 14 is delayed until near the end of the compression stroke, the main fuel charge being usually injected at a pressure substantially higher than compression pressure, for example between 800–1000 p. s. i. During the time when the injection of the main fuel charge is taking place, the auxiliary mixture in chamber 5 is ignited to produce a stream of hot gases which travels at exceedingly high velocity through the passageway 13 into the main stream of fuel passing into passageway 15 to disperse the latter and burn it very rapidly in admixture with the compressed air. To further promote the rapidity and completeness of combustion, I preferably use in conjunction with the intersecting streams above referred to, a turbulence chamber which is shown in Fig. 2 as having lobes 30 in which the streams are thoroughly mixed with each other and with the compressed air as indicated by the vortically directed arrows in Fig. 2. The passageway 15 and the chamber 30 are in effect parts of the combustion space 4, and as previously mentioned the main fuel charge is burned on a flame front as it is dispersed to mix with the air, as contrasted to an effort to burn in the combustion space a predetermined mixture of air and gas formed prior to ignition.

Fig. 3 shows an illustrative timing diagram for the engine in which, as previously stated, the operation of the inlet and exhaust ports may be assumed to be in accordance with previously known practice since the present invention is not particularly concerned with that phase of the cycle.

The auxiliary gas valve is shown in the diagram as being open over a period beginning fairly early in the compression stroke and continuing to a point somewhat beyond full compression and ignition. In connection with this prase, the main point is that a mixture of air and fuel uniform enough and lean enough to avoid spontaneous ignition as the compression proceeds, should be given time to form in chamber 5 before ignition is secured by spark plug 29. Depending on the pressure in the gas line 9 and the area of opening of valve 6, the valve may remain open for longer or shorter periods and still inject the requisite amount of gas early enough in the compression stroke, or if the pressure in line 9 is lower than in the space 4 while valve 6 is still open, the check valve 11 will close off the injection of further auxiliary gas. The amount of gas injected into chamber 5 will also depend upon the constituency of the supply of gas, i. e. gas consisting mostly of methane tends to withstand more compression without prematuring than gas containing substantial amounts of butane, hexane or pentane. Different gases of the above character will require different gas-to-air ratios, but it is feasible in actual practice to keep the amount of gas injected into the chamber 5 within the range which will avoid spontaneous ignition as compression proceeds, and still be within the range of ignition toward the end of the compression stroke, by electric spark, injected oil or the like. For example, using 100 p. s. i. in the gas line 9, sufficient gas may be injected if the valve 6 opens fairly early in the compression stroke, the check valve 11 closing when the compression pressure rises to 100 p. s. i.; or if the pressure in line 9 be 200 p. s. i., using the same valve opening, the valve 6 may open later in the compression stroke, check valve 11 closing when the compression pressure reaches 200 p. s. i.

As shown in Fig. 3 the ignition of the auxiliary fuel charge, and the initiation of the injection of the main fuel charge, will take place shortly before the end of the compression stroke. Here again the timing may be varied somewhat depending upon the constituency of the gas being used, since a gas like methane which is relatively less sensitive to self-ignition, may be injected earlier. Speaking generally, the auxiliary fuel charge may be ignited from about 2° up to 10°–15° ahead of dead center, and the injection of the main gas charge may begin between about 8°–15° before dead center and may continue until about 10° or 15° after dead center, or may be completed before dead center is reached. To secure complete combustion, the injection of the main fuel charge should be completed before the turbulence created by the ignition of the auxiliary fuel charge has died down. Here again, gases like methane which are relatively less sensitive to self-ignition may be injected somewhat earlier and at lower pressure and still avoid pre-ignition of the auxiliary fuel charge in some cases being timed to take place after the injection of the main fuel charge has been initiated.

The invention is useful over a wide range in compression pressure, depending on the sensitivity to self-ignition of the gaseous fuel employed, and running from pressures used in oil diesel practice downwardly toward 125 p. s. i. In general, as applied both to two-cycle and four-cycle gas fueled engines, and with given sensitivity of the gaseous fuel used, the invention permits higher compression to be used with avoidance of prematuring or detonation, and as applied to two-cycle engines the engine will fire evenly at light load regardless of whether the compression employed be relatively high or low.

While the invention has been disclosed as carried out by an engine of the above described specific construction and mode of operation, it should be understood that changes may be made therein without departing from the invention in its broader aspects, within the scope of the appended claims.

I claim:

1. A gas powered engine of the character described having a cylinder and piston, and having a combustion space adjacent the piston, means for admitting air into the cylinder to be compressed by the piston, means timed to come into operation in the final phase of the compression stroke of the piston, for injecting a main charge of gaseous fuel under pressure into said combustion space, said engine having an auxiliary fuel receiving chamber provided with means acting to form therein prior to full compression in the combustion space, a fuel and air mixture so lean as to avoid self-ignition as compression proceeds, said auxiliary chamber being provided with a passageway directed toward the path of travel of the main gaseous fuel charge when passing into said combustion space, and means timed to come into operation shortly prior to full compression, for igniting the mixture in said auxiliary chamber to produce a stream of hot gases passing through said passageway into the main fuel charge passing into the combustion space, to thereby disperse and burn the main fuel charge as it proceeds into said combustion space.

2. A two-cycle gas powered engine of the character described having a cylinder and piston, and a combustion space adjacent the piston, means for admitting air into the cylinder to be compressed by the piston, said cylinder having a main fuel valve mechanism constructed to inject a stream of gaseous fuel under pressure into said combustion space, said cylinder also having an auxiliary fuel chamber provided with a passageway directed toward the path of travel of the main fuel charge when passing into said combustion space, said auxiliary fuel chamber also having a fuel valve associated therewith, means for timing said last mentioned valve to admit fuel to said auxiliary chamber during the compression stroke of the piston, to form in said auxiliary chamber a gas-air mixture so lean as to avoid self-ignition as the compression proceeds, means timing said first mentioned valve mechanism to initiate the injection of a main charge of fixed gaseous fuel under pressure into said combustion space in the final phase of the compression stroke of the piston, and means timed to ignite the mixture in said auxiliary chamber shortly prior to full compression, to produce a stream of hot gases passing through said passageway into the main fuel charge passing into the combustion space, to thereby disperse and burn the main fuel charge as it proceeds into the combustion space.

3. A gas powered engine of the character described having a cylinder and piston, and having a combustion space adjacent the piston, means for admitting air into the cylinder to be compressed by the piston, said cylinder having a main fuel valve mechanism constructed to inject a stream of gaseous fuel under pressure into said combustion space, said cylinder also having an auxiliary fuel chamber provided with a passageway directed toward the path of travel of the main fuel charge when passing into said combustion space, said auxiliary fuel chamber also having a fuel valve associated therewith, means for timing said last mentioned valve to admit fuel to said auxiliary chamber during the compression stroke of the piston, to form in said auxiliary chamber a gas-air mixture so lean as to avoid self-ignition as the compression proceeds, means timing said first mentioned valve mechanism to initiate the injection of a main charge of gaseous fuel under pressure into said combustion space in the final phase of the compression stroke of the piston, and means timed to ignite the mixture in said auxiliary chamber as the piston nears full compression, to produce a stream of hot gases passing through said passageway into the main fuel charge passing into the combustion space, said engine having a turbulence chamber located in the zone where said stream of hot gases meets the main fuel charge as aforesaid, to augment the dispersion and burning of the main fuel charge in the combustion space.

4. The method of operating a gas engine which includes mixing air and fuel in an auxiliary combustion chamber to form a mixture so lean as to avoid self-ignition at the pressures obtaining in said chamber; compressing air in the cylinder, initiating the injection of a main charge of gaseous fuel under pressure into the cylinder during the final phase of the step of compressing the air, and igniting the mixture in said auxiliary chamber shortly prior to full compression to form a stream of hot gases, and projecting said stream into the main fuel charge as the latter passes into the cylinder to disperse and ignite said main fuel charge.

5. The method of operating a two-cycle gas engine which includes compressing an air charge in the combustion space, passing air during the initial phase of compression from the combustion space into an auxiliary combustion chamber, injecting gaseous fuel into said auxiliary chamber during said initial phase to form in said auxiliary chamber a mixture so lean as to avoid self-ignition in said auxiliary chamber as compression proceeds, initiating the injection of a main charge of gaseous fuel under pressure into the combustion space during the final phase of the step of compressing the air, and igniting the mixture in said auxiliary chamber shortly prior to full compression to form a stream of hot gases, and projecting said stream into the main fuel charge passing into the cylinder to disperse and ignite said main fuel charge.

References Cited in the file of this patent

UNITED STATES PATENTS

| | | |
|---|---|---|
| 1,483,619 | Smith, Jr. | Feb. 12, 1924 |
| 1,616,157 | Werner | Feb. 1, 1927 |
| 1,653,825 | Saives | Dec. 27, 1927 |
| 2,121,921 | Mallory | June 28, 1938 |
| 2,652,039 | Weslake | Sept. 15, 1953 |
| 2,690,741 | Broderson | Oct. 5, 1954 |